Patented Jan. 2, 1940

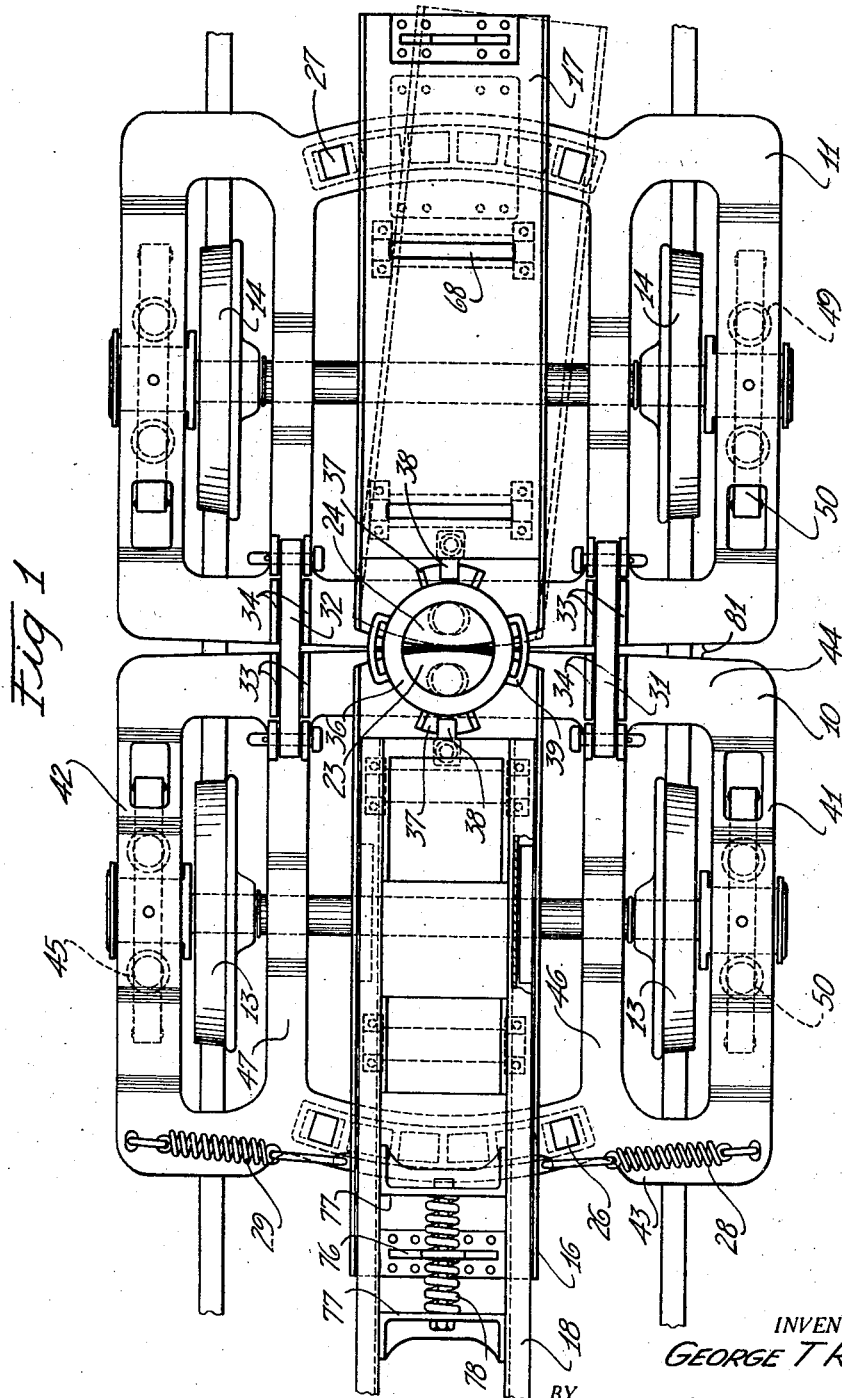

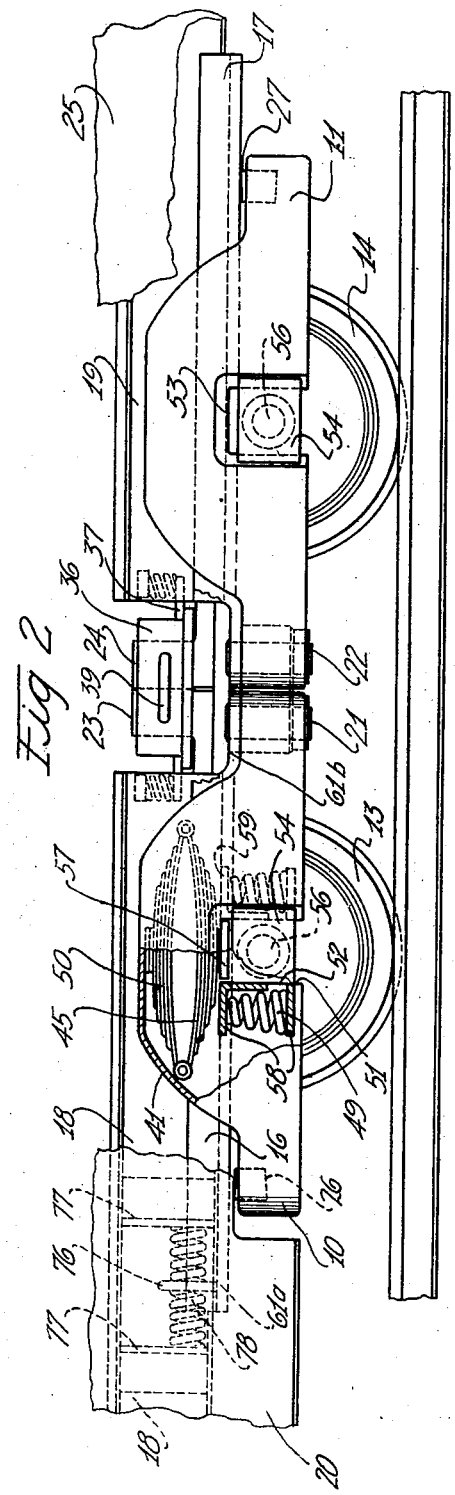

2,185,750

UNITED STATES PATENT OFFICE 2,185,750

TRUCK

George T. Ronk, Lanark, Ill.

Application October 21, 1936, Serial No. 106,913

6 Claims. (Cl. 213—178)

This invention relates to railway train trucks and especially to that type of trains and truck mounting therefor known as the articulated type in which the adjacent ends of two cars are pivotally mounted on the same truck. The present application is a division of my co-pending application, Serial No. 9,135 on Trucks, filed March 4, 1935.

Articulated trains, as now used, have had one serious objection. Inasmuch as the cars are pivotally mounted on a common truck there is no way to separate the cars for switching except with heavy shop equipment, as the ends of the cars must be hoisted off the common pivoted truck and there is then no means of furnishing traction during the switching operation except some overhead carrying means such as a traveling crane.

Moreover, it is extremely desirable to maintain a standard operating practice which provides for lengthening and shortening trains at junction and division points, and for interline and inter-system exchange of cars, especially on transcontinental trains.

It is an object of this invention to provide an articulated railway truck for articulated trains, which will permit said trains to be disconnected and switched at will, and which may be adapted to non-resilient coupling or to varying degrees of resiliency in coupling, dependent on the operative purpose as well as the weight and speed of the train.

It is a further purpose to provide a truck which is separable, one segment to remain under the end of each disconnected car, to furnish a rolling support for switching purposes, and to support said cars in a practical and operable manner.

It is a further purpose to provide for pivoting the segments of the truck near the extreme ends of its supported car, in such a manner that the supporting wheels will follow switch curves and right themselves again on a straight track during switching operations.

There are other purposes and objects, not separately set forth, which will be obvious to one skilled in the art from the specifications and drawings.

In the drawings:

Figure 1 is a plan view of an embodiment of my invention.

Figure 2 is a side elevational view.

Figure 3 is an end elevational view; and

Figure 4 is a view in section of a car sill constructed according to my invention.

In practice, my invention provides a pair of segmental truck members 10 and 11, each of which truck members has means for rotatably mounting a pair of wheels 13 or 14 therein. These truck segments are pivotally engaged to the underside of longitudinally shiftable sill plates 16 and 17 which support sills 18 and 19 of the adjacent cars 20 and 25, by means of pins 21 and 22, and the truck segments pivot about on these pins both in the connected and disconnected relation of these cars. The sills 18 and 19 of the adjacent cars are preferably connected to each other by means of a segmental king pin having the king pin segments 23 and 24. This king pin connection is independent of the pivotal connections of the truck segments, providing a certain stability of train line of draft unaffected by a limited shuttling and oscillation of the integrated truck due to track conditions, but obviously, the pivots and king pin pivots must be so disposed, arranged and constructed that they work together to secure the desired results.

Inasmuch as the truck segments 10 and 11 must pivot about on the pins 21 and 22 it is apparent that some means must be provided at points on the truck segments opposite to the pivot pins to afford stability to the truck segment by bearing a portion of the car weight. Such support is afforded by means of rollers 26 and 27 in the truck segments, which are adapted to bear against the under side of the sill plates 16 and 17. The under sides of the sill plates 16 and 17 are provided with a wear plate 61.

It is desirable, in this embodiment of the invention, that means be provided to resiliently urge the truck segments 10 and 11 to a normally centered or aligned central position after being displaced by arcuate track conditions. One means for accomplishing this result is the spring means indicated at 28 and 29. These springs are connected, as shown, to the sills and to the truck segments.

The truck segments may be detachably engaged to one another by any desirable means but it is preferable that some relative vertical movement between the segments be permitted. On the other hand any lateral or relative horizontal movement should be prevented. One means of accomplishing this result is afforded by the links 31 and 32 which are pivotally engaged to the truck segments 10 and 11 so that the truck segments may move vertically to a limited degree but such that any relative horizontal or lateral movement is prevented by the lugs 33 and 34 on the respective truck segments which confine the links.

Coupling of the sills of the cars, through coupling of the king pin segments 23 and 24, is accomplished by a heavy surrounding ring 36, which we may term the king pin ring. This ring may be placed over the segments 23 and 24 and locked in place by means of ears 37 on the ring and latches 38 on the sills. Handles 39 are also provided in order that the trainmen may lift the ring by hand.

It is apparent from the foregoing description that I have provided a truck structure such that the cars may be disconnected one from the other and the truck segments will still support the cars and will operate as independent units to swivel about to accommodate the truck to the curves and inequalities in the track, yet, when the truck segments are connected together, they act as a single pivotal unit which will also swivel about to permit the integrated truck to accommodate itself to curves and inequalities of the truck. In other words I have provided a truck which may be divided into operable segments which will still function as did the original complete unit.

In the broad aspect of the invention the foregoing is a statement in general of the structure and operation of a device constructed according to my invention. I have found however that there are certain advantages to be derived from the specific structure which I am about to describe.

The truck segments are preferably rectangular in plan view and preferably a single casting comprised of side members 41 and 42, end members 43 and 44 and connecting or bracing members 46 and 47 arched for axle clearance. The side members 41 and 42 are hollow and arched in order that elliptic springs 45 and 50 and coiled spiral-helical springs 49 may be received within the side members 41 and 42. The side members 41 and 42 are cut away, as indicated at 51, and are provided with side walls 52 and upper walls 53 in order that bearing blocks 54 for the axle 56 may be received in the recesses so formed. The central portions of the elliptic springs 50 are secured to the under side of the uppermost portions of the side members 41 and 42 and the lower springs 45 are provided with rolling pads 57 adapted to be engaged on the bearing blocks 54. The side members 41 and 42 are provided with ears 59 projecting inwardly from the side walls 52 and are adapted to receive the upper ends of the coiled spiral-helical springs 49. The lower ends of the bearing blocks 54 are provided with outwardly, horizontally-extending ears 58 adapted to receive the lower ends of the springs 49. It is now apparent that the elliptic and coil springs work in parallel relation with each other and it has been found that the combination of elliptic and coiled springs, with the coil springs wound in spiral-helical form, is of marked assistance in breaking up any tendency toward harmonic movement of the trucks on the wheels and consequent harmonic flexing of the springs, which harmonic flexing has been found to cause surging and rough riding.

It is evident also that this clustering of springs, leaves the center of the truck free for low hung car sills and provides individual wheel springing, producing the cushioning effect known as "knee action".

The end portion 43 of the truck 10 is provided with a curved section adapted for mounting the rollers 26 therein and the rollers roll on the underside of wear plates 61 which are firmly attached to the sill plates 16 and 17. The sill plates 16 and 17 are channel shaped (Figures 3 and 4) and extend from a point well inside the end portion 43 of the truck 10, as indicated at 61a, to a position at the outermost end 44 of the truck 10, as indicated at 61b. The pins 21 and 22 are engaged to the centers of the end portions 44 of the trucks 10 and 11 and to the ends of the sill plates 16 and 17. The openings for the pins 21 and 22 are elongated in an arc to permit the truck to pivot substantially about the axis of the king pin when the segments are coupled together.

The sills 18 and 19 are comprised of heavy channels arranged to form a box section (Figure 3), and cross supports 62, for supporting the floor 63 of the car 10, are arranged to engage the sills. The sides 64 of the cars preferably extend down almost to the center line of the wheels for streamlining.

In this embodiment of the invention the sill plates 16 and 17 are made longitudinally shiftable with reference to the sills 18 and 19 for permitting the truck segments and integrated truck to shift longitudinally to a limited degree with respect to the sills and the cars they support. A preferred means of securing this result is to provide transversely extending rollers 66 which are mounted for rotation in brackets 67 which are, in turn, secured to the underside of sill plates 16 and 17. The rollers 66 project through rectangular openings 68 in the sill plates 16 and 17 and are so located that they roll upon contact plates 69. The contact plates 69 are secured to spacer castings 71 which in turn are welded or otherwise secured to channels or sills 18. A layer of fibrous material 72 is preferably disposed between the contact plates 69 and spacer castings 71 to absorb shock and vibration.

In order to prevent the sills 18 and 19 from being displaced from the sill plates 16 and 17 I preferably employ angle iron slides 73 on the outside faces of the sills 18 and 19 and replaceable wear slides 74 on the upper edges of the upturned portions of the sill plates 16 and 17. The wear slides 74 project inwardly from the sill plates over the slides 73 and thus prevent the sills from being displaced. I preferably dispose strips 75 of fibrous material between the slides 73 and sills 18 and 19 to absorb shock and vibration.

The sill plates 16 and 17 are provided with vertically extending ears 76 at the innermost end portions 61a and these ears extend upwardly into the spaces between the vertical channels which constitute the sills 18 and 19. Partitions 77 are provided within the sills, one on either side of the ears 76, and springs 78 are engaged between the ears 76 and the partitions 77. The sills 18 and 19 may roll on rollers 66 on the bottom of the sill plates 16 and 17 to a degree limited by the springs 78. It is apparent that the springs 78 will permit the truck segments and integrated trucks to move longitudinally with respect to the cars 20 and 25 and in this manner some longitudinal movement of the trucks and truck segments with respect to the cars may be had for cushioning shocks due to braking and track unevenness.

The adjacent sides 44 of the truck segments 10 and 11 are preferably slightly beveled, as indicated at 81, to permit some slight rocking movement of the trucks with respect to each other, if desired, for limited dirigibility of wheeling. The king pin segments 23 and 24 are rounded, as indicated in Figure 1, to permit the cars to rotate the king pin segments to a limited degree while the train goes around the curve. The dotted lines of Figure 1 indicate the position of the sill plate 17 and sill 19 as the train rounds a curve.

The preferred structure just described may be termed a "semi-resilient" truck since longitudinal movement of the integrated truck relative to the car sills is afforded and since there is some slight rocking movement of one truck segment on the other.

It may be readily understood that a truck constructed according to my invention provides for compound articulation of the truck segments in that each of the truck segments pivots about its own pivot pin and that, because of the slotted connection of the pivot pins in the truck segments, the truck as a whole substantially pivots about a common vertical axis passing through the axis of the king pin.

Herein it will be seen that I have invented a novel railway truck for articulated trains, which will permit of extremely high speeds, by virtue of low center of gravity, freedom from relative oscillation on curves, freedom from spring surging, freedom from truck vibration and braking shocks, freedom from the danger inherent in multiple parts; and also by virtue of flexible but closely fitted attachmens and coordinating elements; and which, at the same time, will permit of standard switching and car interchange operations.

I claim as my invention:

1. In an articulated train of cars, means for connecting the adjacent ends of two cars comprising an upwardly extending segmental cylindrical king pin coupling, the king pin segments of which have slightly arcuate faces on their axis line, with a cylindrical detachable ring for holding the segment faces together to permit pivotal action on the said axis line, said ring adapted to be moved to operative position by being placed over the tops of the segments and adapted to closely engage the outer faces of the segments at all times.

2. A car coupling means comprising upwardly extending cylindrical segments having arcuate contacting faces on the adjacent ends of two adjacent cars and a cylindrical ring member adapted to be moved to operative position by being placed over the tops of the segments and further adapted to closely engage the outer faces of the segments at all times.

3. A coupling means for connecting adjacent cars of an articulated train comprising upwardly extending semi-cylindrical members having arcuate contacting faces and having a common axis when the cars are in adjacent relation and a cylindrical ring member adapted to be engaged over the semi-cylindrical members by being placed over the tops thereof to closely engage the outer faces of same at all times so as to provide a king pin connection for connecting adjacent cars with a minimum of lost motion.

4. In an articulated train of cars, each car having a sill on which the car body is supported and means for pivotally mounting the sill on trucks, means for connecting the cars comprising semi-cylindrical, upwardly extending segments on the adjacent ends of the car sills, each segment being rounded on the adjacent faces thereof, a cylindrical ring adapted to be engaged on the segments by being placed over the tops of same and adapted to closely engage the outer faces of the segments at all times and means for holding the ring in its engaged position.

5. In an articulated train of cars, having means for pivotally supporting the cars upon their respective trucks, other means for connecting the adjacent ends of two cars including upwardly projecting semi-cylindrical members on the adjoining end of each car with the semi-cylindrical faces of the upwardly projecting members disposed to form substantially a full cylinder, but with the abutting faces of the upwardly projecting semi-cylindrical members slightly curved in arcuate form, whereby when the cars pass around a curve the abutting faces will roll on one another, whereby the diameter across the two upwardly projecting semi-cylindrical members will be substantially the same regardless of the position of the cars, and a cylindrical ring adapted to be placed over the tops of the upwardly projecting semi-cylindrical members to closely engage the outer faces of the semi-cylindrical members at all times, whereby the segments are held in close relation, said ring held in position by gravity and a retaining latch, thus allowing limited vertical, lateral and pivotal movement without lost motion.

6. In an articulated train of cars in which the ends of adjacent cars are supported upon segmental separable trucks, a means for connecting the adjacent ends of two cars so as to permit limited lateral or vertical or pivotal movement without any appreciable lost motion in the coupling means, said means comprising a segmental cylindrical king pin, one segment on each car, the adjoining faces of said segments being slightly arcuate in a horizontal plane, and a cylindrical ring adapted to be moved to operative position by being placed over the tops of the segments, the inner surface of the said ring being adapted to closely engage at all times the outer surfaces of the king pin.

GEORGE T. RONK.